Figure 1:
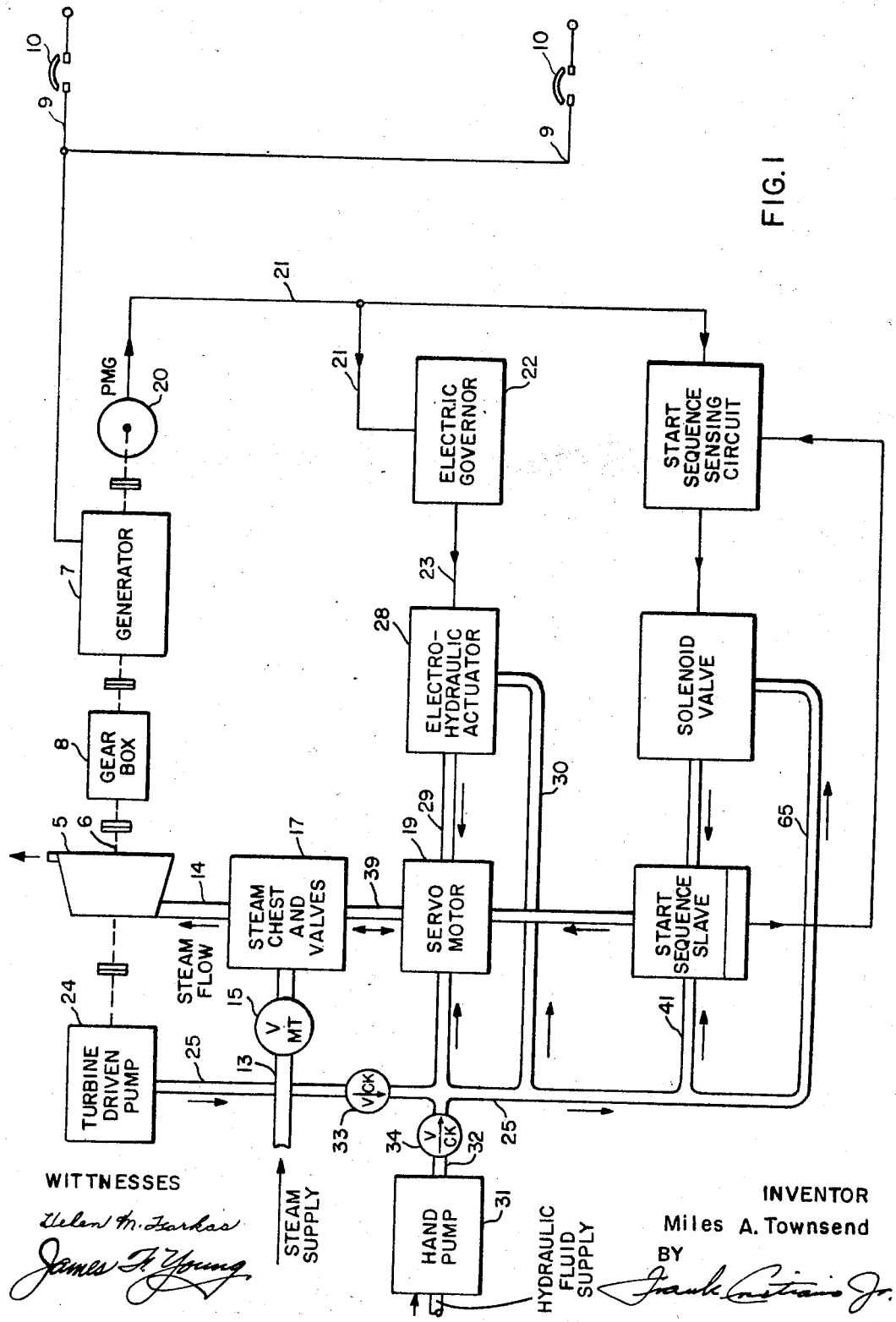

United States Patent Office 3,446,483
Patented May 27, 1969

3,446,483
CONTROL SYSTEM FOR TURBINES
Miles A. Townsend, Rockford, Ill., assignor to Westinghouse Electric Corporation, Pittsburgh, Pa., a corporation of Pennsylvania
Filed Oct. 13, 1966, Ser. No. 586,455
Int. Cl. F01d 17/06, 17/20, 19/00
U.S. Cl. 253—59                                            7 Claims This invention relates to turbine control apparatus and more particularly to apparatus for controlling a turbine for driving an electrical generator unit.

Such turbine-generator units, usually called T-G sets, are controlled by hydraulic servomotors which regulate the governing valves of the turbine in response to speed and/or electrical load on the generator. The hydraulic fluid is usually pressurized by a turbine driven pump, hence at starting the fluid pressure must be built up by other means not dependent on the turbine, such as a manually actuated pump. Also, the governor is not effective to properly control the governing valves until the turbine attains a speed of about 75% of its normal running speed, hence a manually actuated push button or lever has heretofore been employed to move the servomotor pilot valve to a position in which it permits the pressurized hydraulic fluid to actuate the servomotor piston in governing valve opening direction.

Obviously, the above apparatus requires that an attendant physically hold the button or lever depressed until the governor assumes control of the governing valves, of if the button or lever is of the type that may be latched in the depressed position, the attendant must be on hand to unlatch the same when required.

It has been proposed to bias the servomotor pilot valve to the open position and to employ the governor to move the pilot valve against its bias when the governor assumes control. However, this is not a fail safe arrangement, but a dangerous and undesirable arrangement, since in the event of failure of the governor during operation the pilot valve would move to its fully open position, thereby moving the governing valves to their fully open position and causing the T-G set to overspeed. Overspeed trip devices are usually employed for safety, but such trip devices are effective to also trip out other T-G sets paralleled therewith. Accordingly the above is neither fully reliable nor desirable.

It is an object of this invention to provide a servomotor control system for a turbine-generator unit employing a governor for controlling the servomotor, in which the servomotor is automatically actuated to initiate and maintain opening of the governing valve upon starting until the governor can assume control.

Another object is to provide a fluid actuated servomotor control system for a turbine generator unit employing a speed responsive governor for hydraulically controlling the servomotor above a predetermined percentage of speed, in which the servomotor is automatically actuated to the valve opening position by a fluid pressure to initiate starting of the turbine and in which the control of the servomotor is automatically transferred to the governor as the speed of the turbine attains a preselected percentage of the set speed.

A more specific object of the invention is to provide a control in accordance with the above objects in which the governor is actuated by an electrical signal indicative of the turbine speed and an electrohydraulic actuator is interposed between the governor and the servomotor for converting the electrical output signal of the governor to a pressurized fluid signal for the servomotor.

Yet another object is to provide a control in accordance with the above objects in which automatic transfer of control to an electric governor is provided by the electrical speed signal when the speed signal is of sufficiently high value to permit the assumption of control by the governor.

Briefly, there is provided a control system for regulating the speed of a turbine generator unit, wherein the turbine is provided with motive steam regulated by servomotor actuated governing valve structure and the steam is supplied to the governing valves through a main throttle valve. The servomotor is of the fluid actuated type (for example hydraulic) and the pressurized fluid is provided by a pump driven by the turbine shaft.

The governing valve servomotor is regulated by a governor responsive to speed of the turbine, preferably an electric governor responsive to a voltage input signal generated by a turbine driven electrical generator (such as a permanent magnet tachometer generator) and having an electrical output signal converted by an electrohydraulic transducer or actuator, into a regulating pressure for positioning the servomotor pilot valve.

Since the pump for providing the servomotor actuating fluid is driven by the turbine, at "start-up" the fluid is pressurized by suitable auxiliary means, such as a hand pump. However, since the electric governor is ineffective to control the servomotor until the turbine is running at a sufficient speed to provide an adequate voltage input to the governor, the governing valves must be opened by other means to initiate steam flow to the turbine. Heretofore, such initial opening has been effected by manually positioning the servomotor pilot valve until the governor could assume control of the pilot valve.

In accordance with the invention, the improvement in the above control system resides in the provision of means to automatically position the servomotor pilot valve at "start-up" so that the governing valves are moved by the servomotor power piston to the open position and initiate steam flow to the turbine, and means to transfer control of the servomotor pilot valve to the governor before the turbine attains its normal or set speed. As the turbine attains a speed sufficient to provide an adequate electrical speed signal to the governor, the transfer means is tripped by the electrical speed signal and remains tripped until the turbine generator unit is shut down. The transfer means is maintained in the tripped position by the hydraulic fluid pressure, and, as the turbine stops, the fluid pressure decays permitting the transfer means to automatically reset in readiness for another starting cycle when required.

Figure 2:
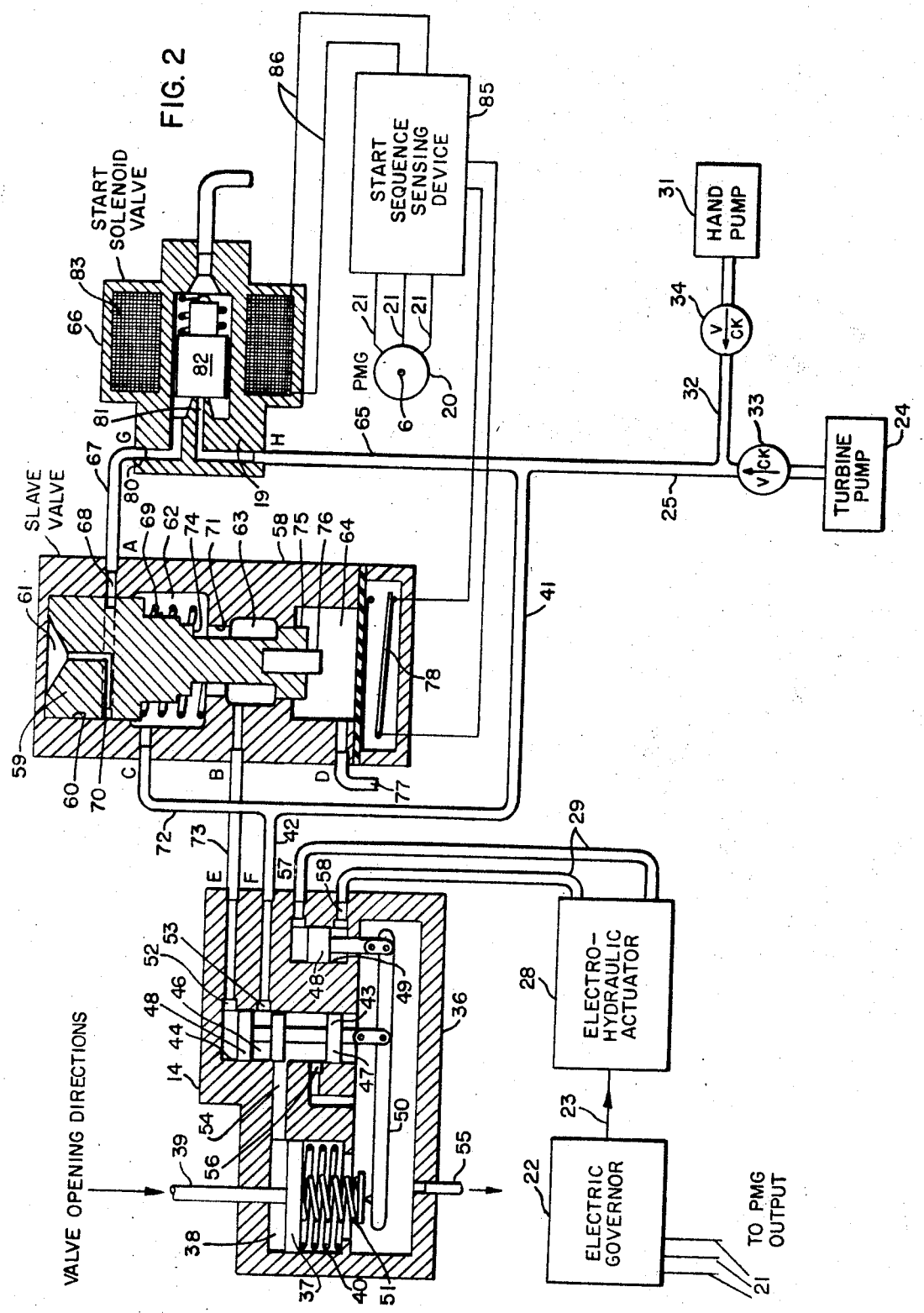
Figure 3:
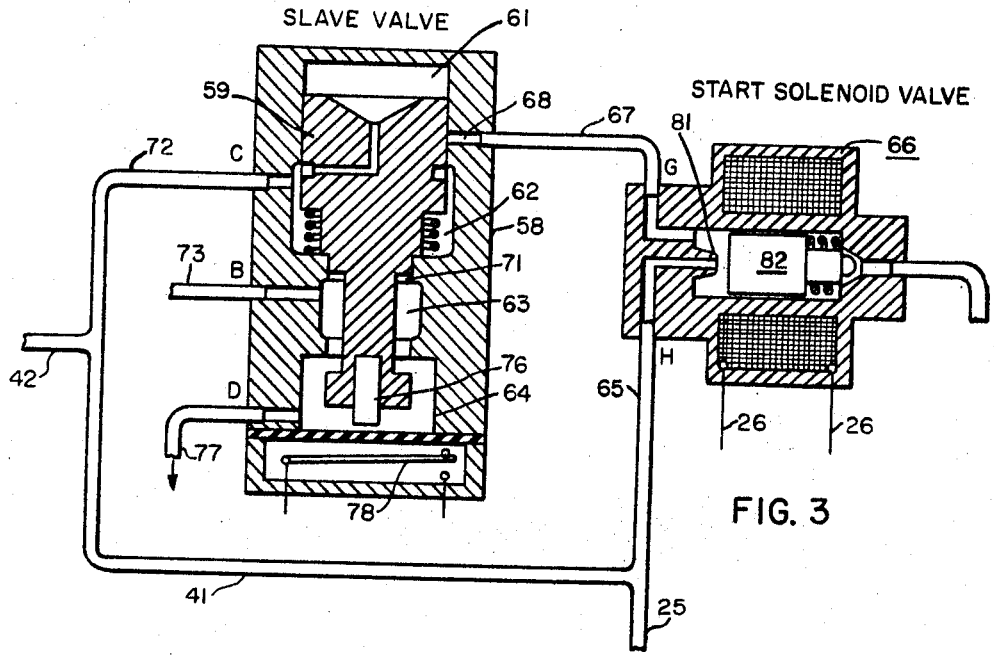
Figure 4:
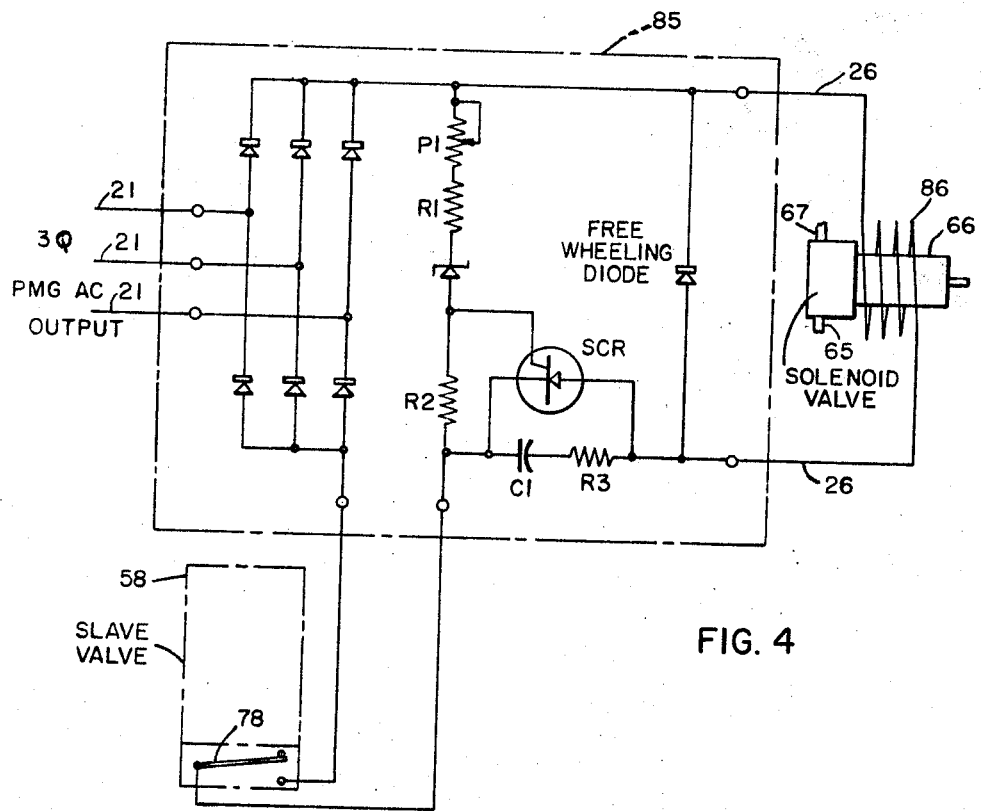

The above and the objects are effected by the invention as will be apparent from the following description and claims taken in connection with the accompanying drawings, forming a part of this application, in which:

FIGURE 1 is a block diagram of the overall turbine control system of the invention;

FIG. 2 comprises a detailed diagram of various components of the control system shown in FIG. 1;

FIG. 3 is a detailed diagram of some of the components shown in FIG. 2, but in different operating positions; and FIG. 4 is a detailed wiring diagram of a start sequence sensing device and its connections to the main electrical components in FIG. 1.

Referring to the drawings in detail, FIG. 1 shows a turbine 5 having its output shaft 6 drivingly connected to an electric generator 7 by a suitable gear box 8.

The generator 7 is employed to provide electrical power to electrical equipment (not shown) by way of suitable electrical conductors 9 having the usual overload tripping devices 10 interposed therein.

The turbine 5 is motivated by elastic fluid, for example steam, and is connected to a suitable supply (not shown) by suitable conduit structures 13 and 14 having interposed therein a main throttle valve 15 and a steam chest and governing valve structure 17.

The governing valve structure 17 may be of any suitable type movable by a servomotor 19 to regulate the steam flow to the turbine, as required to maintain the speed thereof at a set value, as indicated by a suitable speed sensing device 20 responsive to speed of the shaft 6. The speed sensing device 20 is effective to provide a speed signal 21 to a governor 22 which in turn is effective to provide an output signal 23 for controlling the servomotor 19.

In the illustration, the servomotor 19 is of the pressurized fluid actuated type (for example hydraulically actuated), while the governor 22 is of the electrically actuated type. Accordingly there is provided a hydraulic fluid system including a turbine shaft driven pump 24 for providing pressurized fluid to the servomotor 19 by way of suitable conduit structure 25, 26. Further, a tachometer generator is employed as the speed sensing deivce 20 so that its output or speed signal 21 for the governor 22 is in the form of an electrical voltage proportional to speed of the turbine shaft 6. Since the output signal 23 of the electrical governor is also in the form of an electrical voltage, an electrohydraulic transducer or actuator 28 is employed to convert the governor output 23 to a proportional fluid pressure signal 29 and hydraulic fluid is supplied to the E/H transducer 28 by a conduit 30 connected to the conduit 25.

Upon initially starting of the turbine 5 the hydraulic fluid is in an unpressurized state, since the turbine driven pump 24 is at rest. Hence, initial pressure is supplied by an auxiliary pump, such as the hand operated pump 31 connected to the conduit 25 by a branch conduit 32. Both the turbine driven pump 24 and the hand driven pump 31 are preferably provided with suitable check valves 33, 34, respectively, to prevent loss of pressure when at rest.

As thus far described, the system is substantially conventional. Hence the specific detail structure has not been illustrated and need not be described, with the exception that, in accordance with the invention, the servomotor 19 is modified and is illustrated structurally in FIG. 2.

The servomotor 19 (FIG. 2) comprises a housing 36 having a power piston 37 slidably received in a cylindrical chamber 38 and having a piston rod 39 extending through the housing 36 and connected to the governing valve structure 17 (FIG. 1) in a manner to move the governing valves in opening direction upon downward movement and in closing direction upon upward movement of the piston 37. The piston 37 is biased in upward direction (valve closing direction) by a suitable spring 40 and is movable in downward direction (valve opening direction) by hydraulic fluid admitted to the chamber 38 from the hydraulic conduit 25 by way of branch conduits 41 and 42. Within the housing 36 there is provided a pilot valve 43 slidably received in a suitable cylindrical bore 44 and having a plurality of spaced lands 45, 46 and 47. There is further provided a relay valve 48 slidably received in a cylindrical bore 49. The pilot valve 43 and the relay valve 48 are pivotally connected to a lever 50 which in turn is biased against the power piston 37 by a spring 51.

Hydraulic fluid is admitted to the pilot valve 43 by a pair of ports 52 and 53 and to the power piston chamber 38 by a port 54, while fluid is directed from the chamber 38 to a suitable drain 55 by a port 56.

Pressurized fluid constituting the fluid signal 29 from the E/H actuator is directed to the relay valve 48 by a pair of ports 57 and 58, to move the relay and position the pilot valve 43. The servomotor 19 is illustrated in a position of rest wherein no hydraulic fluid is acting on the power piston since the pilot valve is in a position wherein the fluid is bled from the chamber 38 through ports 54 and 56 to the drain 55. Accordingly, the power piston 37 is in its uppermost position and the governing valves 17 are closed.

It will be seen from the above that in the event of malfunction of the governor 22 and/or the E/H actuator 28 causing loss of the fluid pressure signal 29, the servomotor 19 will fail "safe," i.e. close the governing valves 17 and thus interrupt flow of motive steam to the turbine 5 (FIG. 1).

It will also now be seen that to initate a starting sequence for the T–G units 5, 7, even though pressurized fluid is provided by the hand pump 31, the pilot valve 43 must be depressed (moved downwardly) to direct the fluid from port 53 through port 54 to the piston chamber 38 in order to cause the governing valves 17 to open.

In accordance with the invention, the pilot valve 43 is moved downwardly by hydraulic fluid admitted to the bore 44 via the port 52, during a starting sequence, to initiate opening of the governing valves 17, in a manner which will now be described.

A two-position hydraulically actuated slave valve mechanism 58 is provided having a movable valve piston 59 disposed in a bore 60 and jointly therewith defining a plurality of chambers 61, 62, 63 and 64. Hydraulic fluid for actuating the slave valve 58, is delivered to chamber 61 by a branch conduit 65 through an electrically operated valve structure 66 and a conduit 67 communicating with a port 68. The movable slave piston 59 is biased to the upper position (shown in FIG. 2) by a spring 69, and is movable in downward direction to a second position by hydraulic fluid directed to the upper chamber 61 by suitable passage portions 70 in the piston 59.

The chambers 62 and 63 are disposed in communication with each other by an internal passageway 71 and hydraulic fluid is delivered to the port 52 of the servomotor 19 by a branch conduit 72 communicating with the chamber 62 and a conduit 73 connecting the servomotor port 52 and the chamber 63.

The piston 59 is provided with an annular seat 74 and a cylindrical plug portion 75 having a permanent magnet 76 carried thereby. The chamber 64 is provided with a drain outlet 77 and below the chamber 64 there is provided a normally closed reed switch 78.

The electrical valve 66 may be of the solenoid type illustrated, having an inlet 79 communicating with the conduit 65 and an outlet 80 communicating with the port 68, and flow from said inlet to outlet is controlled by a port 81 normally blocked by a spring biased solenoid valve member 82. The valve member 82 is movable in unblocking direction when the electrical winding 83 is energized.

The electrical winding 83 is energized by the electrical speed signal 21 from the tachometer generator 20, which speed signal is directed through a start sequence sensing device 85 to the winding 83 by a pair of conductors 86. The sensing device 85 is of the type effective to transmit a voltage only when the voltage attains a certain value, so that at voltages below said certain value the electrical output circuit is interrupted. In the system disclosed, the sensing device may further be deenergized by the reed switch 78 and is effective to transmit the electrical speed signal (voltage) to the solenoid winding 83 when the reed switch 78 is in the circuit making position shown in FIG. 2 and the speed signal (voltage) corresponds to about 80% of the set speed of the T–G unit. FIG. 4 shows a speed sensing device of the above type by way of example. However such devices are well known and need not be described.

The operation of the above described system is as follows:

In starting, the hydraulic fluid in the system is initially pressurized by operating the hand pump 31, thereby providing pressurized fluid in the conduits 32, 26, 25, 30 and 65. Since the system is in the state shown in FIG. 2 at the initiation of the starting sequence, no fluid pressure is transmitted through the E/H actuator 28 to the servomotor 19, nor is any fluid pressure transmitted to the hydraulic slave valve 58 through the solenoid valve 63.

However pressurized fluid is transmitted to the servomotor 19 directly through conduits 41 and 42 to the pilot valve 43 and through conduits 41, 72 and 73 to the pilot valve 43 by way of the slave valve chambers 62 and 63. The pressurized fluid admitted to the pilot valve 43 by conduit 73 is effective to depress the pilot valve, thereby connecting the servomotor ports 52 and 54 and directing the fluid to the piston chamber 38. Accordingly, the piston 37 and piston rod 39 are moved downwardly and open the governing valves 17.

The throttle valve 15 is then moved to the open position to initiate the flow of motive steam through the now open governing valves 17 to the turbine 5. As the turbine starts to accelerate, the turbine driven pump 24 begins to assume the function of providing the pressurized hydraulic fluid to the system through the conduit 25 and concomitantly, the voltage output or speed signal from the tachometer generator 20 begins to rise.

As the speed signal voltage attains the value at which the electric governor 22 is effective to assume control of the servomotor 19 (about 80% in this example), the start sequence sensing device 85 is effective to transmit the signal voltage to the winding 83 of the solenoid valve 66, thereby unblocking the port 81 and admitting pressurized fluid to the chamber 61 of the slave valve 58 to move the piston 59 to the position shown in FIG. 3.

In this position, the port 68 is blocked, fluid flow from chamber 62 to chamber 63 is terminated, chamber 62 is placed in communication with chamber 61 and the chamber 63 is placed in communication with the drain outlet 71 via the chamber 64. Meanwhile the magnet 76 is brought into close proximity with the magnetic reed switch 78, thereby to move the latter to the circuit opening position and deenergizing the start sequence sensing device 85.

Accordingly, the supply of pressurized fluid through conduit 42 is maintained to provide fluid to the power piston chamber 38, as subsequently required to position the piston 37. However, the fluid pressure above the pilot valve 43 is released and the fluid is directed to the drain 77 by way of condiut 73 and chambers 63 and 64, thereby releasing the pilot valve. Also, the fluid pressure in chamber 61 is maintained to retain the slave piston 59 in the lower position shown during operation of the T–G unit.

Concomitantly with the above, the governor 22 assumes control of the servomotor 19 by providing an electrical signal 23 to the E/H actuator 28 adequate to provide the fluid governing signal pressure in a known manner through conduits 29 to the relay valve 48. The net governing pressure admitted through ports 57 and 58 is effective to urge the relay valve downwardly, thereby moving the link 50 and the pilot valve 43 downwardly, thereby to regulate the fluid to the power piston chamber 38.

Accordingly, control of the pilot valve 43 is transferred by the slave valve mechanism 58 to the governor 22.

Since the start sequence sensing device 85 is deeergized by the open reed switch, the solenoid valve 66 is thus deenergized and the port 81 blocked. However, the slave valve piston 59 is now maintained in its lower position by fluid supplied to the chamber 61 by the conduit 72.

The entire above sequence of operations attained when the speed signal voltage attains 80% of set value occurs in quick succession to transfer control to the governor 22, and the governor is thereafter effective to maintain control of the servomotor, as required to accelerate the turbine to the set speed and maintain the speed thereafter.

At the end of a period of operation, when it is desired to shut down the T–G unit, the throttle valve 15 is turned off to interrupt the motive steam supply, and as the turbine speed drops to zero the turbine driven pump stops running with resulting decay in pressure of the hydraulic fluid in the fluid conduits. Hence, the fluid pressure in the slave valve chamber 61 is relieved and the slave valve piston 59 is restored to its upper position (see FIG. 2) by the spring 69 in readiness for a new starting sequence.

While the invention has been shown in several forms, it will be obvious to those skilled in the art that it is not so limited, but is susceptible of various other changes and modifications without departing from the spirit thereof.

I claim as my invention:

1. In a turbine generator unit comprising a turbine drivingly connected to an electrical generator,
   governing valve structure for controlling the flow of motive fluid to said turbine,
   a servomotor for positioning said governing valve structure,
   a speed governor for controlling said servomotor in a manner to maintain the speed of said turbine at a predetermined value,
   means for sensing the speed of said turbine and providing a speed input signal to said governor,
   means including a first pump driven by said turbine for providing pressurized fluid to said servomotor,
   means including a second pump for providing pressurized fluid to said servomotor when said first pump is not in operation,
   said speed governor being ineffective to control said servomotor when said speed input signal is below a certain value,
   means for positioning said servomotor in a manner to move said governing valve structure to an open position during the period when said speed input signal is below said certain value, thereby to initiate flow of motive fluid to the turbine with attendant rotative acceleration of the turbine and generator, and
   means for tripping said positioning means when said speed input signal attains said certain value and automatically transferring control of said servomotor to said governor, so that the speed of the turbine is thereafter automatically controlled by said governor.

2. The structure recited in claim 1 wherein:
   the speed governor is an electric governor,
   the speed sensing means provides an electrical speed input signal ot the governor, and
   the servomotor positioning means includes a two-position valve structure movable from a first position effective to apply pressurized fluid to bias the servomotor in governing valve opening direction when the electrical speed signal is below said certain value, to a second position effective to release the biasing fluid pressure when the electrical speed signal attains said certain value.

3. The structure recited in claim 2 and further including
   an electrical valve effective to move the two-position valve to the releasing position, and
   means for electrically energizing said electrical valve in response to attainment of said certain speed signal.

4. The structure recited in claim 2 wherein
   the two-position valve is spring-biased to the first position and movable against said bias to the second position by the pressurized fluid, and further including
   an electrical valve having a normally closed port for blocking flow of the pressurized fluid to the two-position valve and movable when energized to the open port position for permitting flow of the pressurized fluid to the two-position valve.

5. The structure recited in claim 2 and further including
   means including a spring for biasing the two-position valve to the first position,
   means responsive to fluid pressure for moving the two-position valve against said bias to the second position,
   an electrical valve having a normally closed port for blocking flow of the pressurized fluid to the two-position valve and movable when energized to the open port position for permitting flow of the pressurized fluid to the last-mentioned means, and
   means for electrically energizing said electrical valve in response to attainment of said certain speed signal.

6. The structure recited in claim 1 wherein
the servomotor includes a power piston for moving the governing valves and a pilot valve for controlling the flow of fluid to said power piston,
the servomotor positioning means includes a two-position valve structure movable from a first position effective to apply pressurized fluid to bias said pilot valve in a direction to effect movement of said power piston in governing valve opening direction when the speed signal is below said certain value, to a second position effective to release the biasing fluid pressure when the speed signal attains said certain value.

7. The structure recited in claim 6 in which
the two-position valve structure is spring biased to the first position and movable to the second position by fluid pressure, and further including
a normally closed valve structure movable to the open position and effective to admit the fluid to the two-positon valve, means for moving said normally closed valve to the open position in response to attainment of said certain speed signal value, and
the tripping means includes means actuable upon movement of the two-position valve to the second position.

References Cited

UNITED STATES PATENTS

| | | |
|---|---|---|
| 2,821,927 | 2/1958 | Schellens. |
| 2,894,521 | 7/1959 | Carleton et al. |
| 2,926,680 | 3/1960 | Eggenberger. |

FOREIGN PATENTS

| | | |
|---|---|---|
| 1,196,887 | 6/1959 | France. |

EVERETTE A. POWELL, JR., *Primary Examiner.*